United States Patent
Zhao et al.

(10) Patent No.: US 9,821,296 B2
(45) Date of Patent: Nov. 21, 2017

(54) PHOTOCATALYTIC COMPOSITIONS AND METHODS FOR THEIR PREPARATION AND USE

(75) Inventors: Chongjun Zhao, Shanghai (CN); Zhen Shao, Shanghai (CN); Yang Xia, Shanghai (CN); Yunlong Xu, Shanghai (CN); Xiuzhen Qian, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 212 days.

(21) Appl. No.: 14/407,757

(22) PCT Filed: Jun. 12, 2012

(86) PCT No.: PCT/CN2012/076919
§ 371 (c)(1),
(2), (4) Date: Dec. 12, 2014

(87) PCT Pub. No.: WO2013/185328
PCT Pub. Date: Dec. 19, 2013

(65) Prior Publication Data
US 2015/0165420 A1    Jun. 18, 2015

(51) Int. Cl.
*B01J 23/10* (2006.01)
*B01J 23/50* (2006.01)
(Continued)

(52) U.S. Cl.
CPC .......... *B01J 27/10* (2013.01); *B01D 53/8687* (2013.01); *B01J 19/123* (2013.01); *B01J 19/127* (2013.01); *B01J 23/10* (2013.01); *B01J 27/08* (2013.01); *B01J 27/125* (2013.01); *B01J 35/004* (2013.01); *C01B 3/042* (2013.01); *C01B 13/0207* (2013.01); *C02F 1/30* (2013.01); *C02F 1/32* (2013.01); *C02F 1/325* (2013.01); *C02F 1/725* (2013.01); *B01D 2255/104* (2013.01); *B01D 2255/206* (2013.01); *B01D 2255/802* (2013.01); *B01D 2257/91* (2013.01);
(Continued)

(58) Field of Classification Search
CPC ... B01J 23/10; B01J 23/50; B01J 23/66; B01J 27/08; B01J 27/10; B01J 27/12; B01J 27/125; B01J 35/004
USPC ................. 502/224, 231, 302–304
See application file for complete search history.

(56) References Cited

U.S. PATENT DOCUMENTS 3,178,289 A * 4/1965 Sottysiak ................. G03C 1/08
                                                          430/265
3,219,452 A * 11/1965 Hartouni .............. G03C 1/4965
                                                          430/596
(Continued)

FOREIGN PATENT DOCUMENTS

EP          0812619 A1    12/1997
EP          1095909 A1     5/2001
JP        09068769 A  *   3/1997  ............... G03C 1/06

OTHER PUBLICATIONS

"Diffusion of Pr 3+ ions in silver halide crystals," L. Nagli et al. Optical Materials 16 (2001), pp. 243-248.*
(Continued)

*Primary Examiner* — Patricia L Hailey
(74) *Attorney, Agent, or Firm* — Dorsey & Whitney LLP

(57) ABSTRACT

A photocatalytic composition is disclosed that includes a silver halide in combination with one or more rare earth elements. The composition may be used for the photocatalytic degradation of pollutants.

9 Claims, 10 Drawing Sheets

(51) Int. Cl.
*B01J 23/66* (2006.01)
*B01J 27/10* (2006.01)
*C02F 1/30* (2006.01)
*C02F 1/32* (2006.01)
*C02F 1/72* (2006.01)
*B01J 27/08* (2006.01)
*B01J 35/00* (2006.01)
*B01J 27/125* (2006.01)
*C01B 3/04* (2006.01)
*C01B 13/02* (2006.01)
*B01D 53/86* (2006.01)
*B01J 19/12* (2006.01)
*C02F 1/00* (2006.01)
*C02F 1/28* (2006.01)
*C02F 1/38* (2006.01)
*C02F 101/30* (2006.01)
*B01J 37/03* (2006.01)
*B01J 37/04* (2006.01)

(52) U.S. Cl.
CPC ............ *B01J 37/031* (2013.01); *B01J 37/04* (2013.01); *B01J 2219/0877* (2013.01); *B01J 2219/1203* (2013.01); *C02F 1/004* (2013.01); *C02F 1/281* (2013.01); *C02F 1/288* (2013.01); *C02F 1/385* (2013.01); *C02F 2101/30* (2013.01); *C02F 2101/308* (2013.01); *C02F 2201/006* (2013.01); *C02F 2303/04* (2013.01); *C02F 2303/185* (2013.01); *C02F 2305/10* (2013.01); *Y02E 60/364* (2013.01)

(56) References Cited

U.S. PATENT DOCUMENTS

| | | | | |
|---|---|---|---|---|
| 3,816,601 | A * | 6/1974 | Junod | C01G 5/00 117/12 |
| 3,932,292 | A * | 1/1976 | Junod | C01G 1/06 252/62.3 R |
| 4,806,462 | A * | 2/1989 | Yamashita | G03C 1/08 430/604 |
| 5,503,970 | A * | 4/1996 | Olm | G03C 1/0051 430/567 |
| 6,451,521 | B1 * | 9/2002 | Berthaller | G03C 7/3022 430/556 |
| 6,740,483 | B1 * | 5/2004 | Royster, Jr. | G03C 1/005 430/567 |
| 7,229,600 | B2 | 6/2007 | Yadav | |
| 2006/0172236 | A1 * | 8/2006 | Maeda | G03C 3/00 430/619 |

OTHER PUBLICATIONS

"Rare earth ion diffusion in AbBr crystals," L. Nagli et al. Optical Materials 13 (1999), pp. 89-95.*
"Middle-infrared luminescence of Nd ions in silver halide crystals," I. Shafir et al. Journal of Luminescence 126 (2007), pp. 541-546.*
"Diffusion of Pr3+ ions in silver halide crystals," L. Nagli et al. Optical Materials 16 (2001), pp. 243-248.*
Bingham, S., and Daoud, W.A., "Recent advances in making nano-sized TiO2 visible-light active through rare-earth metal doping," J. Mater. Chem., vol. 21, Issue 7, pp. 2041-2050 (2011).
El-Bahy, Z. M., et al., Enhancement of titania by doping rare earth for photodegradation of organic dye (Direct Blue), Journal of Hazardous Materials, vol. 166, Issue 1, pp. 138-143 (Jul. 15, 2009).
Gu, S., et al Preparation and characterization of visible light-driven AgCl/PPy photocatalyst, Journal of Alloys and Compounds, vol. 509, Issue 18, pp. 5677-5682 (May 5, 2011).
International Search Report for International Application No. PCT/CN2012/076919, dated Mar. 21, 2013.
Jian, Z., et al., "Microemulsion synthesis of nanosized TiO2 particles doping with rare-earth and their photocatalytic activity," Photochemistry Photobiology, vol. 86, Issue 5, pp. 1016-1021 (Sep./Oct. 2010).
Liang, C. H., et al., "The enhancement of adsorption and photocatalytic activity of rare earth ions doped TiO2 for the degradation of Orange I," Dyes and Pigments, vol. 76, Issue 2, pp. 477-484 (2008).
Liu, Y., et al., "Photocatalyzed degradation of direct sky blue 5B in AgCl dispersions under UV and simulated sunlight irradiation," Journal of Shandong Institute of Light Industry(Natural Science Edition), vol. 25, No. 1, pp. 31-34 (Feb. 2011).
Shafir, I., et al., "Raman spectroscopy of rare earth doped silver halide crystals," Appl. Phys. Lett., vol. 94, Issue 23, pp. 1-3 (2009).
Z.X, Li, et al, "Ytterbium stabilized ordered mesoporous titania for near-infrared photocatalysis," Chem. Commun., vol. 47, Issue 28, pp. 8109-8111 (Jul. 28, 2011).
Wang, L., "Applications of Gel Electrophoresis in Quantum Dot Conjugates' Separation and Purification," pp. 1-67 (Jul. 2009).

* cited by examiner

PHOTOCATALYTIC COMPOSITIONS AND METHODS FOR THEIR PREPARATION AND USE

CROSS-REFERENCE TO RELATED APPLICATION

This Application is the U.S. National Stage filing under 35 U.S.C. § 371 of International Application No. PCT/CN2012/076919 filed on Jun. 12, 2012 entitled "PHOTOCATALYTIC COMPOSITIONS AND METHODS FOR THEIR PREPARATION AND USE" which is incorporated herein by reference in its entirety.

BACKGROUND

Field

Embodiments of the present disclosure relate to the combination of silver halides and rare earth elements for the photocatalytic degradation of pollutants.

Description of the Related Art

Currently, photocatalytic technologies, especially visible-light photocatalytic technologies, are significant for solving problems of new clean energy and environmental protection, and the precondition for satisfying these demands is to develop visible-light photocatalysts with high efficiency and stability.

Methods of doping rare earth elements have been widely used in the system of $TiO_2$ photocatalytic materials, and they have a certain effect on improvement of its photocatalytic property. However, current researches of technologies for improvement of responsivity of $TiO_2$ to visible light via doping or modification are not quite satisfying while visible-light photocatalytic property of visible-light-excitative materials including silver halides, tungstates and the like has attracted great attention from researchers.

SUMMARY

In one embodiment, a composition is disclosed. The composition includes a silver halide combined with one or more rare earth elements selected from the group consisting of Sc, Y, La, Ce, Pm, Sm, Eu, Gd, Dy, Ho, Tm, Yb, and Lu. The composition may have activity as a UV photocatalyst. The composition may have activity as a visible light photocatalyst. In some embodiments of the composition, the silver halide is doped with other elements. The silver halide may be doped with elements from the group selected of Ce, Sm, and Eu. The other elements may have a wt. % of about 1% to about 5%.

In some embodiments, the cycle life (or stability) of the composition is greater than the cycle life of the silver halide without the rare earth element(s). The cycle life of the composition may be at least about 20% greater than the cycle life of the silver halide without the rare earth element(s). The cycle life of the composition may be at least about 6 cycles of irradiation.

In some embodiments, the light trapping property of the composition is greater than the light trapping property of the silver halide without the rare earth element(s). The light trapping property of the composition may be about 5% to about 15% greater than the light trapping property of the silver halide without the rare earth element(s).

In some embodiments, the separation of photo-generated electron-holes of the composition is greater than the separation of photo-generated electron-holes of the silver halide without the rare earth element(s). The separation of photo-generated electron-holes of the composition may be about 5% to about 15% greater than the separation of photo-generated electron-holes of the silver halide without the rare earth element(s).

In some embodiments, the composition has a degradation efficiency of at least about 70%. The degradation efficiency may relate to the efficiency of photocatalytic degradation of pollutants.

In some embodiments, the molar ratio of the rare earth element to the silver halide is about 0.01% to about 10%.

In one embodiment, a method is disclosed for increasing photocatalytic stability of silver halides. The method includes combining a silver halide with one or more rare earth elements to form a composition that exhibits greater photocatalytic stability relative to the photocatalytic stability of the silver halide without the rare earth element(s). The silver halide and the rare earth element(s) may be combined by one or more different processes, including for example, a wet chemical reaction, a heat treating process, a mechanical alloying process, a mechanical mixing process, and a co-precipitation process.

In an embodiment of the disclosed method, the molar ratio of the rare earth element to the silver halide in the composition is between about 0.01% to about 10%.

In one embodiment, a method for degrading a pollutant is disclosed. The method includes: providing a composition including a silver halide and one or more rare earth elements; contacting the pollutant with the composition to form a mixture; and irradiating the mixture with light, wherein the light activates photocatalytic properties of the silver halide, thereby catalyzing degradation of the pollutant. In different embodiments of the disclosed method, the pollutant may be a gas, an organic molecule, an inorganic molecule, a microbe, or a bacterium. The irradiating light may be UV light or visible light.

A device is disclosed in one embodiment for degrading a pollutant. The device includes: a reaction chamber configured to allow contact between the pollutant and a composition including a silver halide and one or more rare earth elements; and a light source configured to irradiate the composition and the pollutant within the reaction chamber, wherein the light irradiation is sufficient to activate photocatalytic properties of the silver halide, thereby catalyzing degradation of the pollutant.

In one embodiment, a method is disclosed for producing hydrogen and oxygen gas. The method includes: providing a composition comprising a silver halide and one or more rare earth elements; contacting the composition with water to form a mixture; and irradiating the mixture with light, wherein the light activates photocatalytic properties of the silver halide, thereby decomposing the water by photocatalysis to produce hydrogen and oxygen gas.

In another embodiment, a method is disclosed for recovering from a solution a photocatalytic composition that includes a silver halide and a rare earth element. The method may include filtration and/or centrifugation steps.

A device is also disclosed for recovering from a solution a photocatalytic composition that includes a silver halide and a rare earth element. The device may include an evacuation pump and/or a centrifuge.

DETAILED DESCRIPTION

Figure 1:
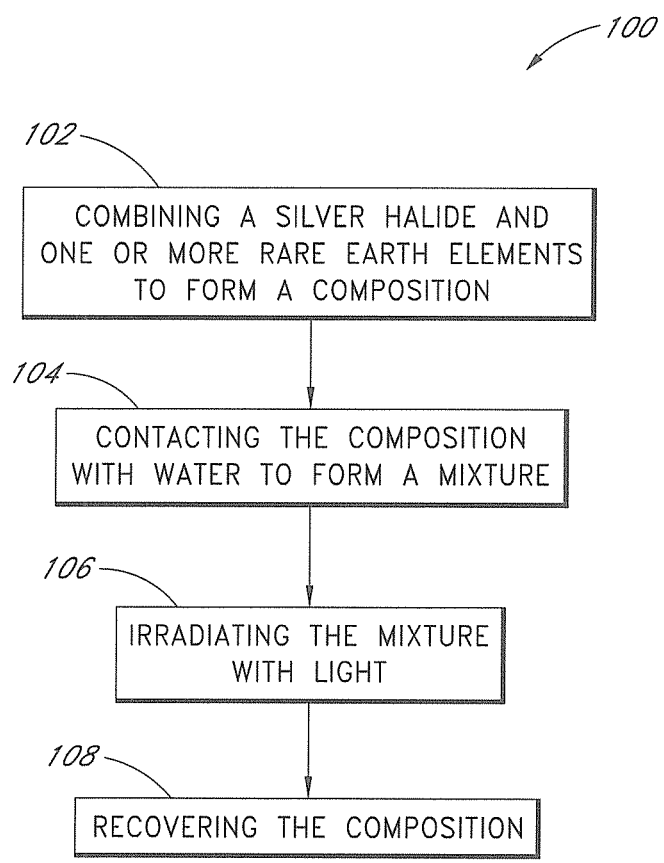
FIG. 1 shows a process for forming a silver halide-rare earth element composition and using it to degrade a pollutant.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Any terms not directly defined herein shall be understood to have all of the meanings commonly associated with them as understood within the art. Certain terms are discussed below, or elsewhere in the specification, to provide additional guidance to the practitioner in describing the compositions, methods, systems, and the like of various embodiments, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Some synonyms or substitutable methods, materials and the like are provided. Recital of one or a few synonyms or equivalents does not exclude use of other synonyms or equivalents, unless it is explicitly stated. Use of examples in the specification, including examples of terms, is for illustrative purposes only and does not limit the scope and meaning of the embodiments herein.

The terms "approximately", "about," and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although photocatalytic technologies play a role in solving problems of energy and environmental protection, their further applications have so far still been limited by the lack of photocatalysts with high efficiency and stability and, in particular, the lack of visible-light photocatalysts. Silver halides have a good responsivity to visible light, and therefore are good candidates for visible-light photocatalysts. However, their stability is one factor limiting application of such photocatalysts. One method to increase the photocatalytic stability of silver halides is to combine them with a rare earth element. This composition would have greater photocatalytic stability compared to silver halides alone.

Silver halides can be used as photocatalysts because of their photosensitive properties, discussed later in this application. For example, silver halides have been used as photocatalysts in photographic film and photographic paper. In some embodiments, a compound can be formed between silver atoms and one of several halogens through electrostatic or covalent bonding. Silver nitrates can be used to precipitate the halides and form a silver halide. Halogens are highly reactive elements due to their high effective nuclear charge creating a large electronegative charge. The halogens can be, for example, bromide to form AgBr, chloride to form AgCl, and iodide to form AgI. Fluoride can also be used as the halogen to form, for example, silver(I) fluoride AgF, silver difluoride $AgF_2$, or silver subfluoride $Ag_2F$. Commonly, silver halides can be formed with silver atoms having the oxidation state of +1, however other oxidation states can be used, such as, for example, an oxidation state of +2. In some embodiments, a silver halide can be doped with other elements. For example, elements such as cerium, samarium, or europium can be doped into the silver halide. About 1 to about 5 wt. % of the doping elements may be added to the silver halide.

In some embodiments, rare earth elements can be combined with silver halides to form a compound and increase the stability of the silver halide. Rare earth elements, including the lanthanide series, include 17 different chemical elements. These elements include scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Preferably, a composition is formed from a silver halide and one of the elements selected from the group consisting of Sc, Y, La, Ce, Pm, Sm, Eu, Gd, Dy, Ho, Tm, Yb and Lu.

Rare earth elements show a variety of excellent properties, which are not present in other elements, due to their special electronic arrangements. All of the rare earth elements have the ability to exhibit a 3+ oxidation state. Also, the prices for most rare earth elements are low except for a small number of rare earth elements for military use, and therefore, incorporation of rare earth elements will favorably reduce cost of photocatalysis. Furthermore, the amount of catalyst can be reduced due to photocatalytic properties being improved by rare earth elements, and therefore, cost of photocatalysis can be further reduced.

In some embodiments, co-precipitation can be used to form a silver halide-rare earth element composition. For example, $AgNo_3$ and $Sm(NO_3)_3$ can be mixed together in $H_2O$. After mixing, a solution of NaCl/NaF can be added into the previous mixture, causing co-precipitation of a crystal of mixed composition of both the silver halide and the rare earth elements. Common means of co-precipitation are adsorption, occlusion or mechanical entrapment. However, other methods of co-precipitation can be used to form the composition of silver halides and rare earth elements.

In some embodiments, wet chemical reactions can be used to form a silver halide-rare earth element composition.

An example of a wet chemical reaction is a sol-gel process. During the sol-gel process, a colloidal solution can be treated to form an integrated network. In some embodiments, silver halides and rare earth elements are combined in a solution to form the colloidal solution. The solution can then be centrifuged to remove the solvent. In some embodiments, the solution can be dried to remove the solvent. The remaining material can then be thermally treated by, for example, firing or sintering. Upon removing all of the liquid, the solid can be deposited on a substrate to form a film or used to synthesize powders. Other wet chemical reactions can also be used to form a silver halide-rare earth element composition.

In some embodiments, a heat treating process can be used to form a silver halide-rare earth element composition. For example, a heat treating process with a flux of inert gas, e.g., $N_2$ or Ar, or in vacuum conditions, can be used.

In some embodiments, mechanical alloying can be used to form a silver halide-rare earth element composition. The composition can have one or more microstructure phases. The elements can be combined with alloying such as substitutional or interstitial. For example, a silver halide powder can be mixed with different rare earth elements. This mixture can be mechanically ground by ball milling for at least approximately 10 hours, forming an alloy of the silver halide-rare earth element composition.

In some embodiments, mechanical mixing can be used to form a silver halide-rare earth element composition. The two elements can be combined by physically mixing them together to form a composition. Devices such as industrial mixers or agitators can be used to form the composition by mechanical mixing. The composition can also be formed through mixing by a person.

In some embodiments, a combination of processes, such as the ones listed above, can be used to combine the silver halide and the rare earth element. The composition can take many non-limiting forms. For example, the composition can be in the form of a powder. In some embodiments, the composite can be dispersed into solutions to form a suspension. In some embodiments, the composition can be immobilized on a carrier such as, but not limited to, a fluid bed.

Degradation

Silver halides can act to degrade pollutants in an environment through photocatalysis. A silver halide has the ability to create electron-hole pairs, also known as excitons. The pairs can be generated when a silver halide is subjected to increased amounts of radiation such as, but not limited to, visible or UV light. If the silver halide is subjected to radiation exceeding its band gap, the electron-hole pairs are generated so additional electrons can enter the conduction band of the material, while holes remain in the valence band of the material. The electron-hole pairs can then create free radicals, and therefore facilitate redox, or oxidation-reduction, reactions. These reactions can then degrade the pollutants.

Silver halides are useful as photocatalysts at least in part because of their light trapping properties. Upon formation of a silver halide, imperfections result in the crystal structure. These imperfections result in a charged region of the crystal, known as a trap. Sometimes, the trap can have an absent halide lattice ion, thereby creating a positive hole trap and attracting electrons.

By adding the rare earth element to the silver halide, the separation of photo-generated electron-holes may be increased by at least about 5% and sometimes at least about 10% as compared to silver halides on their own. Also, by adding the rare earth element to the silver halide, the light trapping properties may be similarly increased by at least about 5 to 10% as compared to silver halides on their own.

In some embodiments, a silver halide-rare earth element composition can act as a photocatalyst in the ultraviolet (UV) spectrum. The silver halide-rare earth element composition can be photocatalytically active from radiation with a wavelength of about 10 nm to about 400 nm, and energy from about 3 eV to about 124 eV. The UV spectrum has shorter wavelengths than visible light and cannot be detected by the human eye. UV light can be found in sunlight, and can also be produced through other means such as, for example, black lights, ultraviolet fluorescent lamps, ultraviolet light emitting diodes (LEDs), ultraviolet lasers, and gas-discharge lamps.

In some embodiments, a silver halide-rare earth element composition can act as a photocatalyst in the visible light spectrum. The silver halide-rare earth element composition can be photocatalytically active from radiation with a wavelength of about 390 nm to about 750 nm and a frequency of about 400 THz to about 790 THz. Visible light can be found in sunlight and can be produced through other mean such as, for example, bioluminescence, incandescent light bulbs, LEDs, and gas-discharge lamps.

Adding the rare earth element to the silver halide can also increase adsorption of pollutants from the environment. Adsorption is another process in removing a pollutant from an environment. During adsorption, the pollutants adhere to the surface of the silver halide-rare earth element composition, creating a film over the composition. When the composition is recovered, as discussed below, the pollutant can then be at least partially removed as well.

In some embodiments, the silver halide-rare earth element composition has a specified cycle life. The cycle life is also referred to herein as the photocatalytic stability of the composition. Upon contacting the silver halide-rare earth element composition with a pollutant to be degraded and irradiating the composition the composition can lose degradation efficiency. Once the degradation efficiency of the composition drops below 70%, the composition may be considered at an end to its cycle life. In some embodiments, the degradation efficiency may drop below about 80% to about 40%. A problem with silver halide on its own is how quickly degradation efficiency decreases, and thus how short the cycle life is (in other words, how unstable the silver halide is). However, silver halide-rare earth element compositions may have an increased cycle life of at least about 20% greater than the silver halide without the rare earth element. The composition can be irradiated from about 6 to about 20 times before the degradation efficiency drops below 70%. The silver halide-rare earth element compositions may in some cases be irradiated from about 8, 9, 10, 12, 14, 16, 18, 20 or more times before degradation efficiency drops below 70%.

Besides increased stability or cycle life, the silver halide-rare earth element compositions disclosed herein can also have increased degradation efficiency compared to silver halide compositions that do not include one or more rare earth element(s). Degradation efficiency relates to how much of a given pollutant is degraded after one cycle of irradiation, such as by visible or UV light. For a silver halide-rare earth element composition, the degradation efficiency is at least about 40%, 45%, 50%, 55%, 60%, 65%, 70%, 75%, 80%, 85%, 90% or 95%. In some embodiments, at least about 70% of the pollutant is degraded after one cycle of irradiation.

Process for Degrading a Pollutant

In one embodiment, as illustrated in FIG. 1, a process 100 is disclosed for degrading a pollutant. Silver halide is combined with a rare earth element in 102 to form a composition. This can be done by any combination of co-precipitation, wet chemical reaction, heat treating process, mechanical alloying, and/or mechanical mixing. Other synthesis processes can also be used to form the composition. The composition can have a molar ratio of rare earth element to silver halide of about 0.01% to about 10%.

The composition may then be contacted with a pollutant in 104. This step can be done through numerous non-limiting methods, such as pouring a solution or suspension containing a silver halide-rare earth element composition into a polluted body of water. Alternatively, the silver halide-rare earth element composition may be contacted in powder form with a pollutant. In other embodiments, the silver halide-rare earth element composition may be immobilized on a substrate or within a transparent or translucent carrier, and the immobilized material may be contacted with the pollutant.

In some embodiments, after contacting the composition with a pollutant to form a mixture, the mixture can be irradiated with light 106. In some embodiments, the light can be UV light. In some embodiments, the light can be visible light. The mixture can be irradiated using numerous non-limiting processes. For example, natural sunlight can be used to irradiate the mixture, which contains a combination of UV and visible light. In other embodiments, a UV and/or visible light source(s) may be used, for example within a reaction chamber of a device for degrading pollutants.

The irradiating light may provide sufficient energy to activate the photocatalytic properties of the silver halide, e.g., by forming electron hole pairs as discussed above, thereby catalyzing degradation of the pollutant through a redox reaction. The light used for irradiation can vary over various wavelengths, including the wavelengths associated with UV and visible light. However, other wavelengths of light may also be effective in activating the silver halide. The mixture can be irradiated numerous times, within the cycle life of the silver halide-rare earth element composition, until the level of the pollutant in the mixture is reduced to a desired level. The silver halide-rare earth element composition can be used to degrade different types of pollutants. For example, the pollutant can be a gas, an organic molecule, an inorganic molecule, a microbe, or a bacterium, or any other pollutant or unwanted composition or organism susceptible to photocatalytic degradation.

After one or more cycles of photocatalytic degradation, the silver halide-rare earth element composition may be recovered in 108. Numerous non-limiting processes can be used to obtain the silver halide-rare earth element composition including filtration or centrifugation. Devices such as, but not limited to, an evacuation pump or a centrifuge can be used to recover the silver halide-rare earth element composition. In some embodiments, e.g., using a silver halide-Ce composition, the larger size of such a composition compared to a $TiO_2$ photocatalyst, allows for easier in recovery through conventional processes like filtration and centrifugation. Therefore, more of the composition can be recovered and the composition does not remain in the environment.

Water Treatment Process

Figure 2:
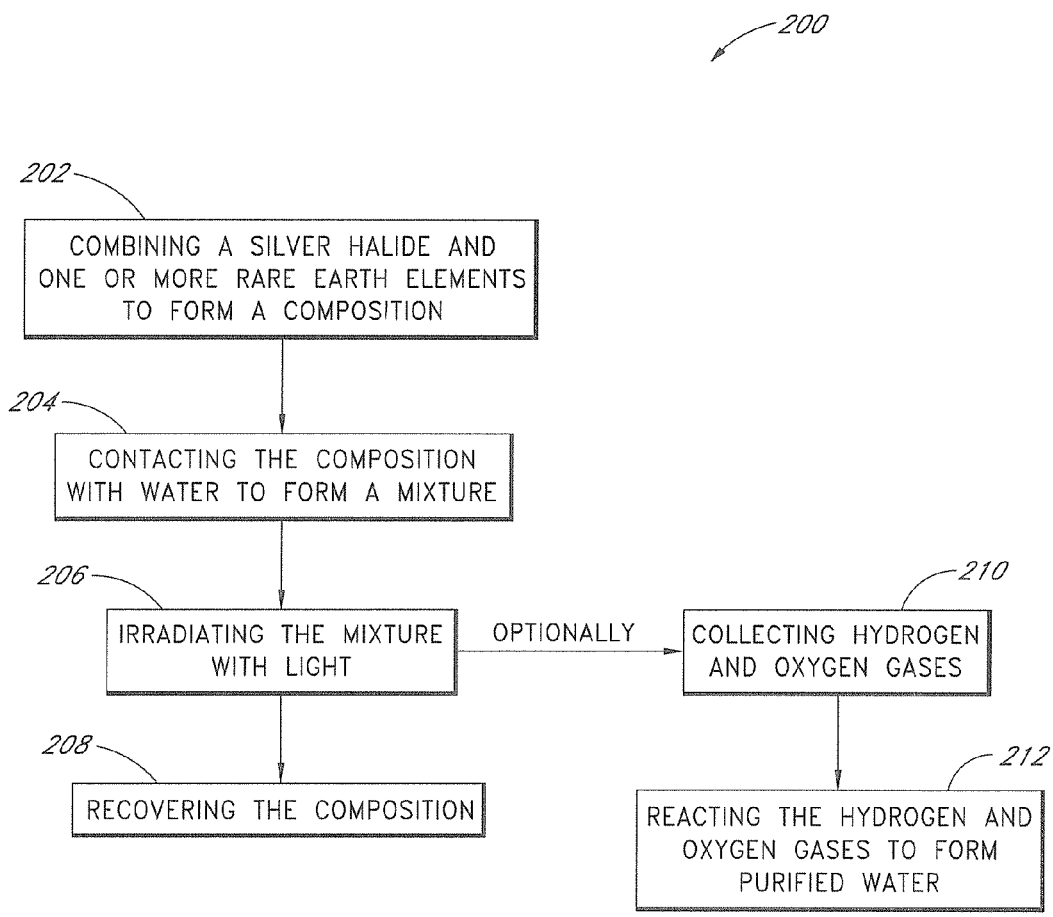
FIG. 2 shows a process for forming a silver halide-rare earth element composition and using it to decompose water.

In some embodiments as illustrated in FIG. 2, a silver halide-rare earth element composition can be used in a process 200 to photocatalyze the generation of hydrogen and oxygen gases from water that may or may not comprise a pollutant. The hydrogen and oxygen gases, can in some embodiments, be recombined to form water with little or no pollution. In 202, a silver halide and a rare earth element are combined as discussed with reference to FIG. 1 to form a composition. The composition can be contacted with water with or without a pollutant in 204 to form a mixture. The mixture can be irradiated with light in 206 to photocatalyze the splitting of water to form hydrogen and oxygen gases. After one or more cycles of irradiation, the silver halide-rare earth element composition may be recovered in 208. Optionally, the gases may be collected in 210 and reacted to form water in 212. The conditions for water treatment can be the same as the conditions for the degradation of pollutants, e.g. a chemical method.

In other embodiments of the water treatment process of 200, the pollutant in solution or suspension in the water may be degraded as discussed with reference to FIG. 1. The silver halide-rare earth element composition can be recovered in 208 as discussed above.

Devices

Figure 3:
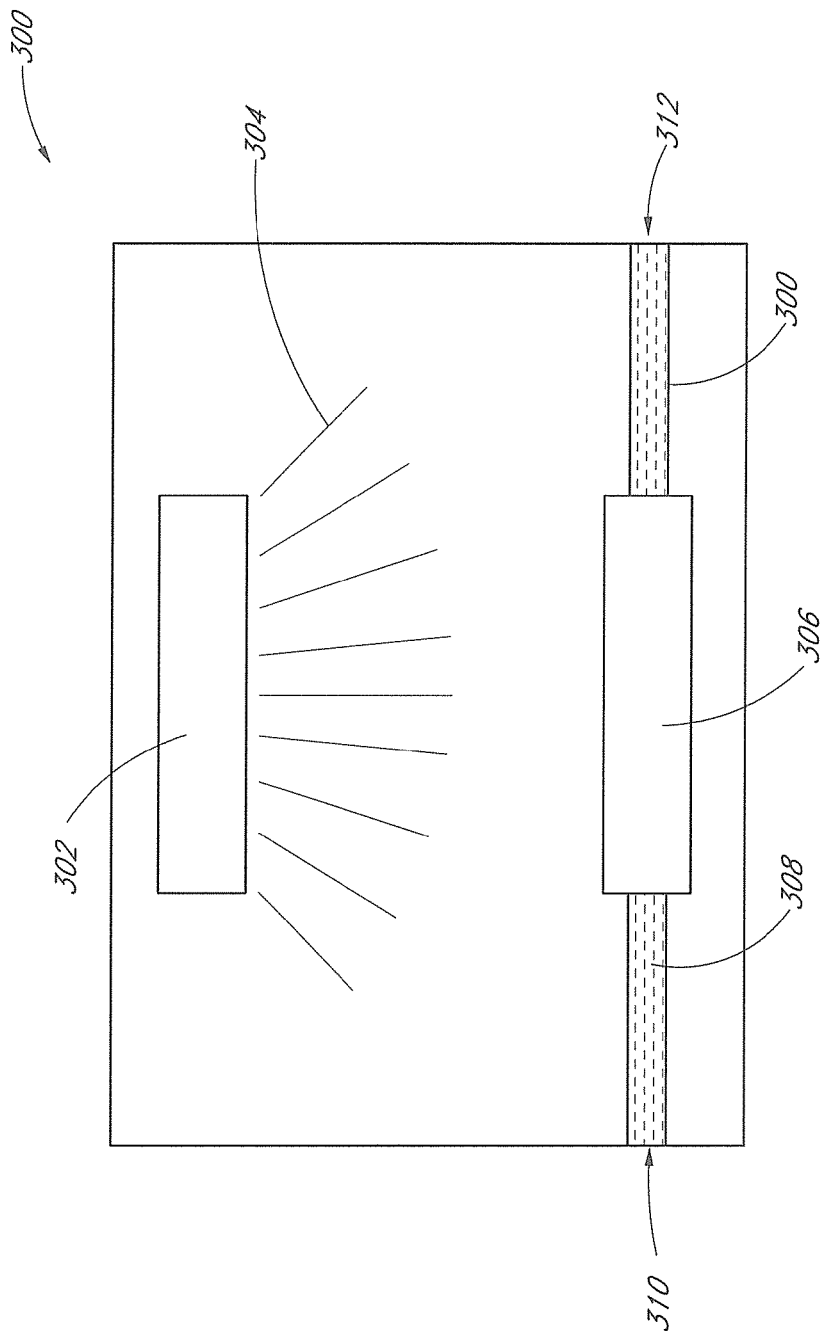
FIG. 3 shows the visible light photodegradation of a methyl orange (MO) dye using a silver halide (AgCl) doped with Ce through mechanical mixing.

In some embodiments, a device, such as a reaction chamber 300 as shown in FIG. 3, can be used to facilitate contact between a silver halide-rare earth element composition and a pollutant. The reaction chamber 300 may have a UV and/or visible light source 302 that can irradiate 304 a holding receptacle, or cartridge, 306. The holding receptacle 306 can contain the silver halide-rare earth element composition. The pollutant can enter the holding receptacle 306 within the reaction chamber 300 under controlled conditions, such that the light irradiation 304 is sufficient to activate the photocatalytic properties of the silver halide. A reaction chamber 300 can also be used for the same process to degrade water with pollutants. Other devices and chambers can also be used to bring the composition in contact with a pollutant or water containing pollutants. In some embodiments, the silver halide-rare earth element composition is immobilized, e.g., on a substrate within the reaction chamber. Use of immobilized composition elements within a reaction chamber 300 would minimize the efforts needed to recover the composition. For example, water 308 with pollutants could flow through an inlet 310 into the reaction chamber 300 and form a mixture with the composition in the holding receptacle 306. The water 308 that has been purified can exit the reaction chamber 300 through an outlet 312 after irradiation 304. The water could be recirculated for repetitive cycles of irradiation and monitored (e.g., by resistivity measurements with an Ohm meter) for pollutant degradation.

WORKING EXAMPLES

The following examples are provided to demonstrate the benefits of a silver halide-rare earth element composition in the degradation of a pollutant. These examples are discussed for illustrative purposes and should not be construed to limit the scope of the disclosed embodiments.

A silver halide-rare earth element composition can be formed by many non-limiting processes, as described above. For example, 100 uL of 0.1 M aqueous $Sm(NO_3)_3$ solution can be added into 10 ml of 0.1 M aqueous $AgNO_3$ solution at room temperature and under surrounding conditions. 10 ml of 0.2 M aqueous NaCl/NaF solution can then be added. After the addition of the NaCl/NaF, 1% molar ratio Sm-doped AgCl precipitates out of the solution and can be collected.

In the following examples, methyl orange (MO) is used as a model pollutant for tracking photocatalysis (cycle life and degradation efficiency) by the silver halide-rare earth element composition.

Figure 4:
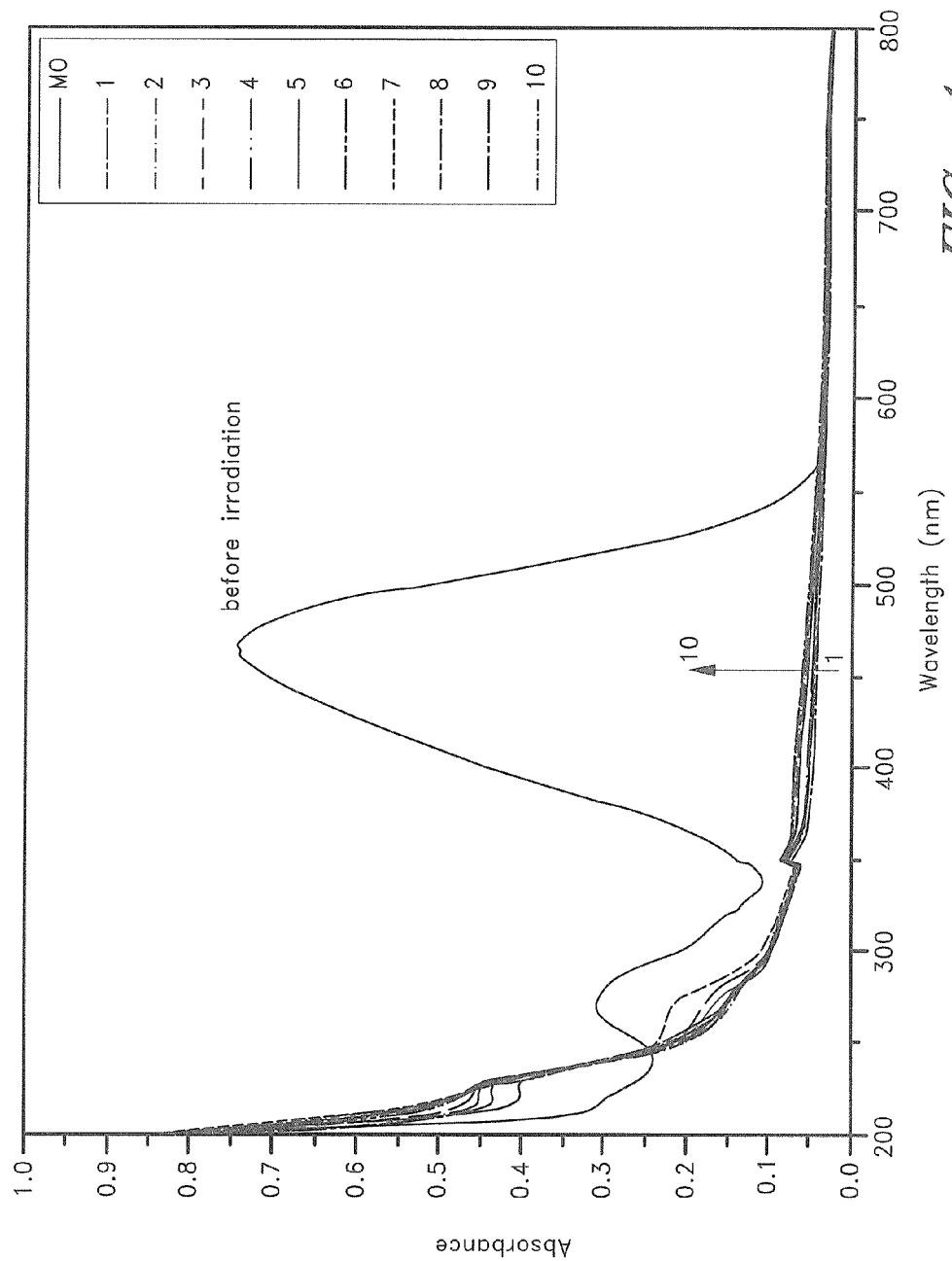
FIG. 4 shows the visible light degradation rate % of MO using a variety of degradation compositions.

Example 1—Effect of Repeated Irradiation on the Photocatalytic Activity of Ce-Doped AgCl Formed by Mechanical Mixing FIG. 4 illustrates photodegradation of MO by Ce-doped AgCl by comparing the absorbance spectrum of MO after repeated irradiation with visible light in the presence of Ce-doped AgCl catalyst. The cerium was combined with silver chloride using a mechanical mixing process. The amount of Ce-doped AgCl used was about 0.10 g and the volume of MO solution was about 25 ml. All data were obtained within 15 minutes of irradiation by visible light. A continuous 10 cycles of the catalyst was monitored. MO had an absorbance peak of around 0.8 prior to photocatalytic degradation. After a single irradiation in the presence of Ce-doped AgCl catalyst, the absorbance of MO decreased to a negligible level, with a degradation rate of about 90% in the first 15 minutes. This illustrates the effectiveness of Ce-doped AgCl on the degradation of MO. Moreover, the Ce-doped AgCl was shown to be a stable photocatalyst, with a cycle life of at least 10 and excellent degradation efficiency of at least about 90% through 10 cycles.

Figure 5:
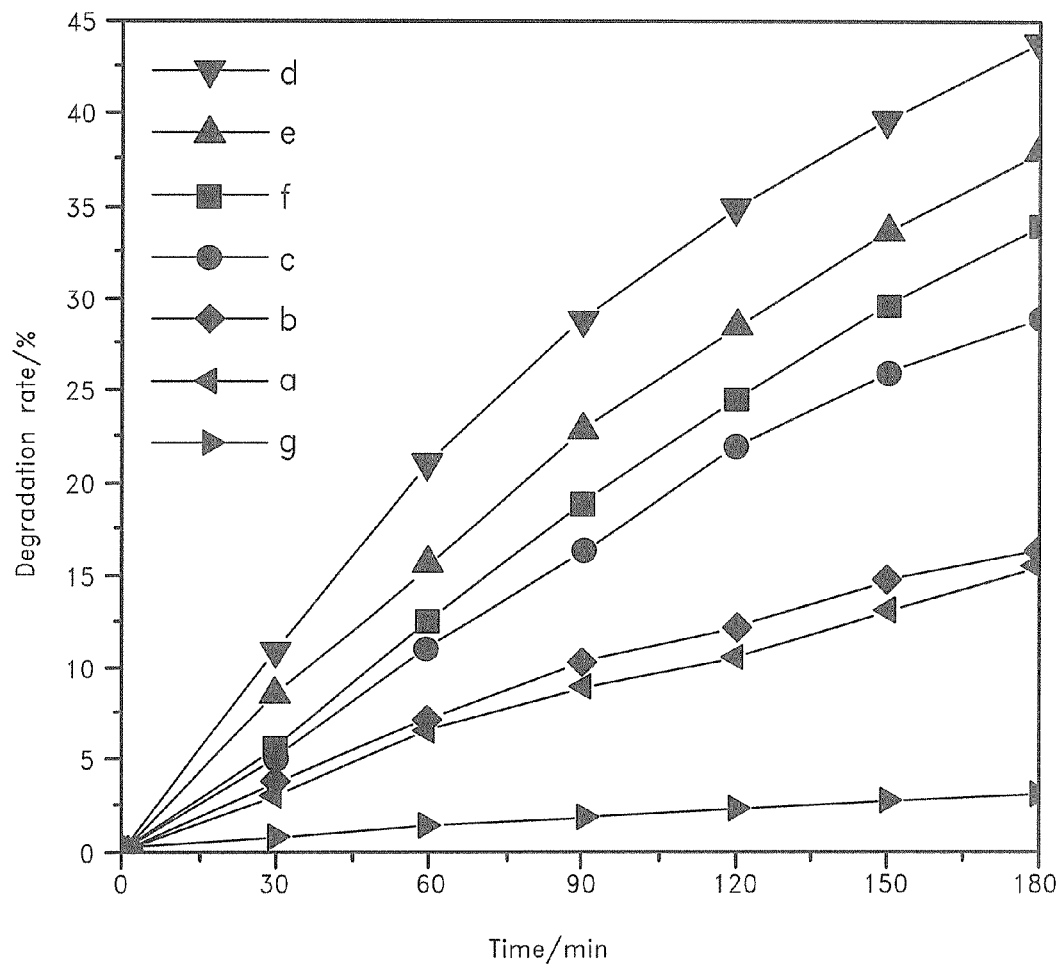
FIG. 5 shows the visible light photodegradation of a MO using a silver halide (AgCl) doped with Ce through co-precipitation.

Example 2—Time Course of Methyl Orange Degradation using Various $TiO_2$ Photocatalysts FIG. 5 illustrates the effectiveness of $TiO_2$ photocatalysts, with and without cerium doping in degrading MO. The representative compositions are: (a) $TiO_2$; (b) 0.01% Ce—$TiO_2$; (c) 0.1% Ce—$TiO_2$; (d) 0.5% Ce—$TiO_2$; (e) 1% Ce—$TiO_2$; (f) 2% Ce—$TiO_2$; and (f) no photocatalyst. As shown by FIG. 5, the maximum degradation rate for these examples is less than 10% at 15 minutes from composition d, which falls well below the degradation rate of MO catalyzed by the Ce-doped AgCl of about 90% at 15 minutes. Thus, Ce-doped AgCl appeared to be superior to Ce-doped $TiO_2$ in photocatalytic degradation of MO.

Figure 6:
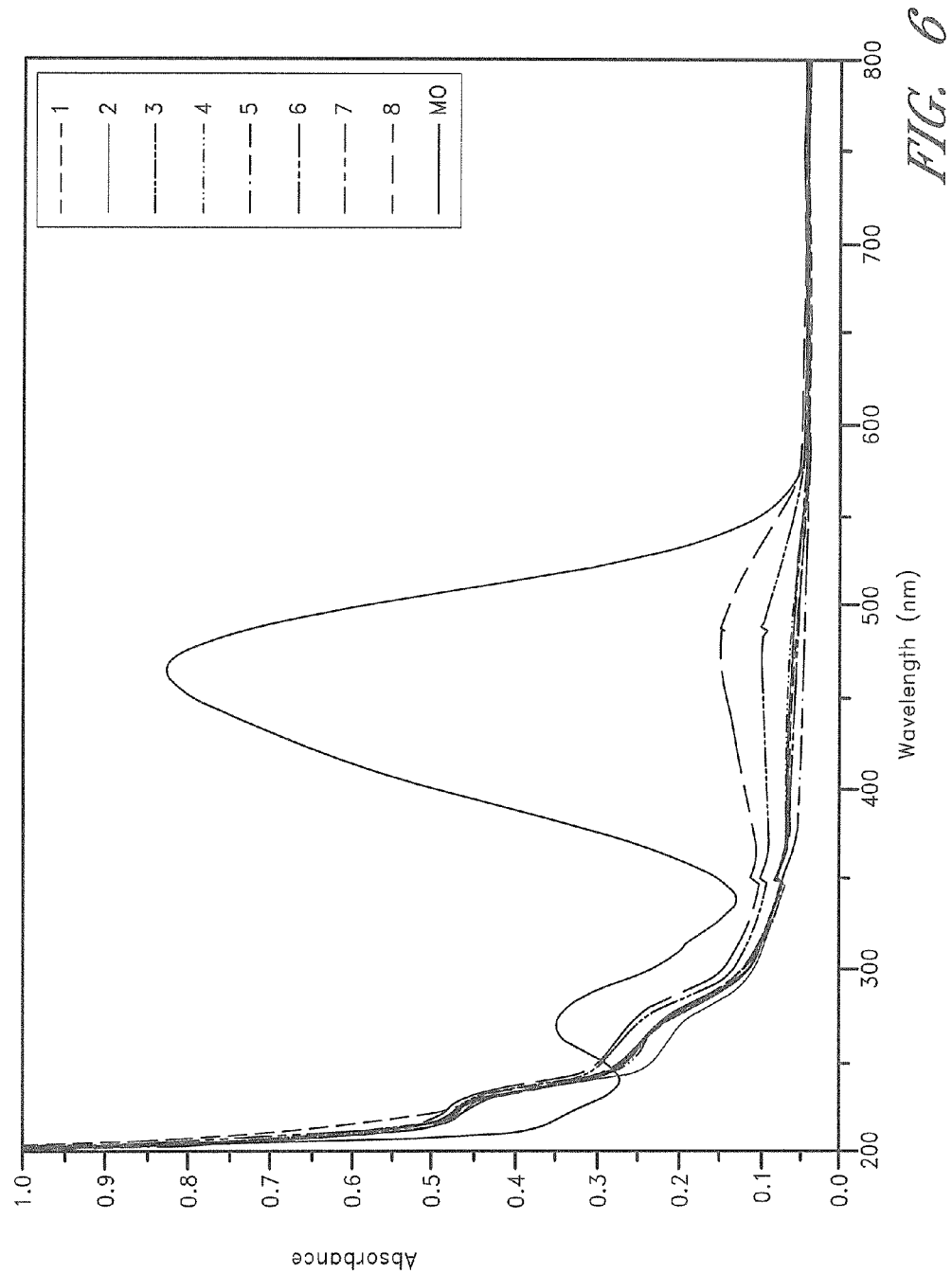
FIG. 6 shows the visible light photodegradation of a MO using an updoped silver halide (AgCl).

Example 3—Effect of Repeated Irradiation on the Photocatalytic Activity of Ce-Doped AgCl Formed by Co-Precipitation FIG. 6 illustrates photodegradation of MO by Ce-doped AgCl by comparing the absorbance spectrum of MO after repeated irradiation with visible light in the presence of Ce-doped AgCl photocatalyst. The cerium was combined with silver chloride by a co-precipitation process. The amount of Ce-doped AgCl used was about 0.05 g and the volume of MO solution was about 25 ml. All data were obtained within 15 minutes of irradiation by visible light. A continuous 8 cycles of the catalyst was used. As shown by FIG. 6, MO had an absorbance of around 0.8 prior to photocatalytic degradation. After a single irradiation in the presence of Ce-doped AgCl, the absorbance of MO decreases to less than about 0.05, with a degradation rate of about 90% in the first 15 minutes. Further cycles of irradiation continue to degrade MO, although a decrease in photocatalytic stability was observed compared to Ce-doped AgCl formed by mechanical mixing (FIG. 4).

Figure 7:
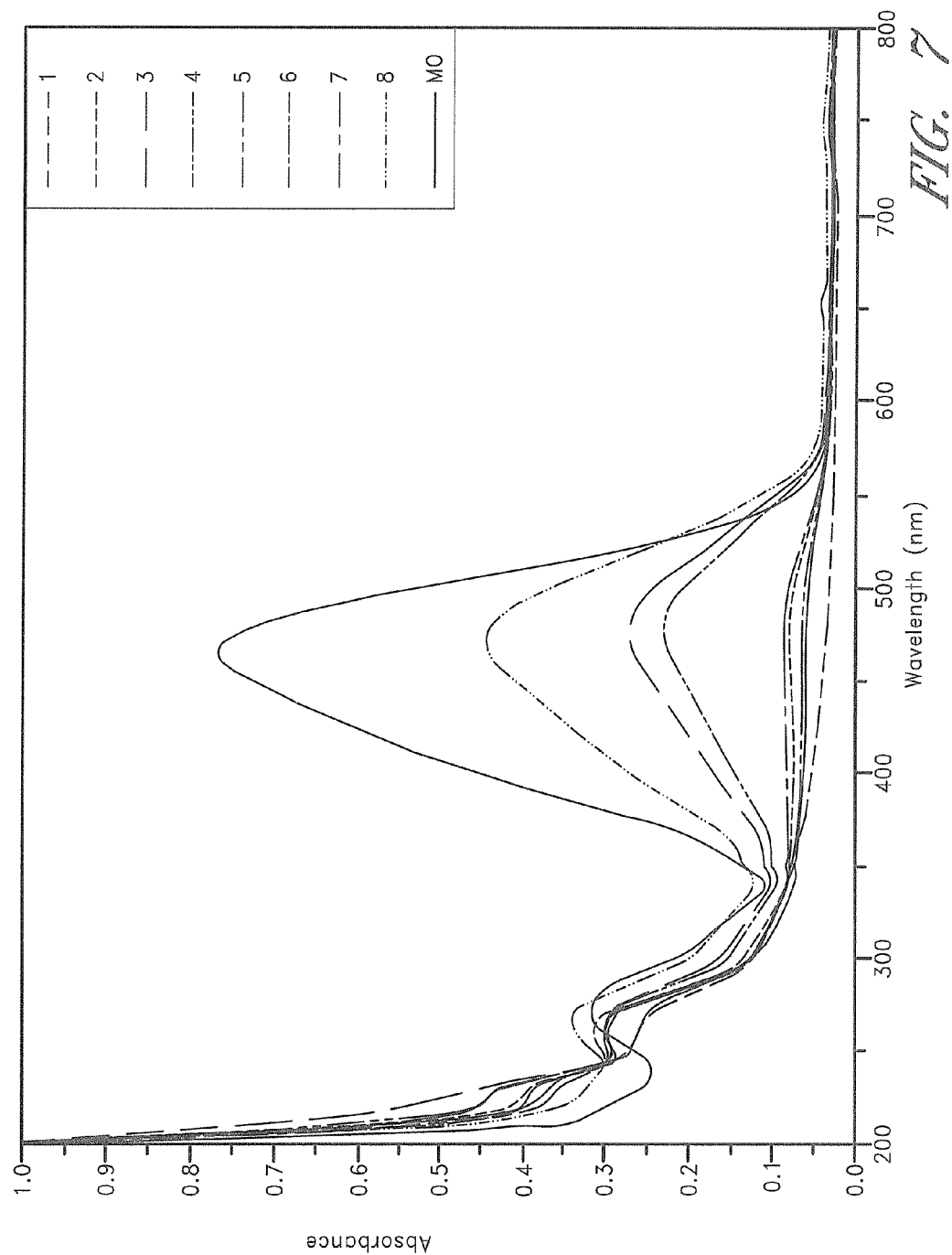
FIG. 7 shows the visible light photodegradation of a MO using a silver halide (AgCl) doped with Sm through mechanical mixing.

Example 4—Effect of Repeated Irradiation on the Photocatalytic Activity of Undoped AgCl FIG. 7 illustrates photodegradation of MO by undoped AgCl by comparing the absorbance spectrum of MO after repeated irradiation with visible light in the presence of AgCl alone. A continuous 8 cycles of the catalyst was used. As shown by FIG. 7, MO has an absorbance of around 0.8 prior to photocatalytic degradation. After a single irradiation, the absorbance of MO decreases to less than 0.05 in the first 15 minutes. However, the photocatalytic activity of the undoped AgCl decreased with each cycle of irradiation, so that by 8 cycles, absorbance of MO was decreased to about 0.45 (corresponding to a degradation rate of only about 40%). These results demonstrate that Ce-doped AgCl (as shown e.g., in FIGS. 4 and 6) provided much greater retention of photocatalytic activity compared to undoped AgCl (as shown in FIG. 7).

Figure 8:
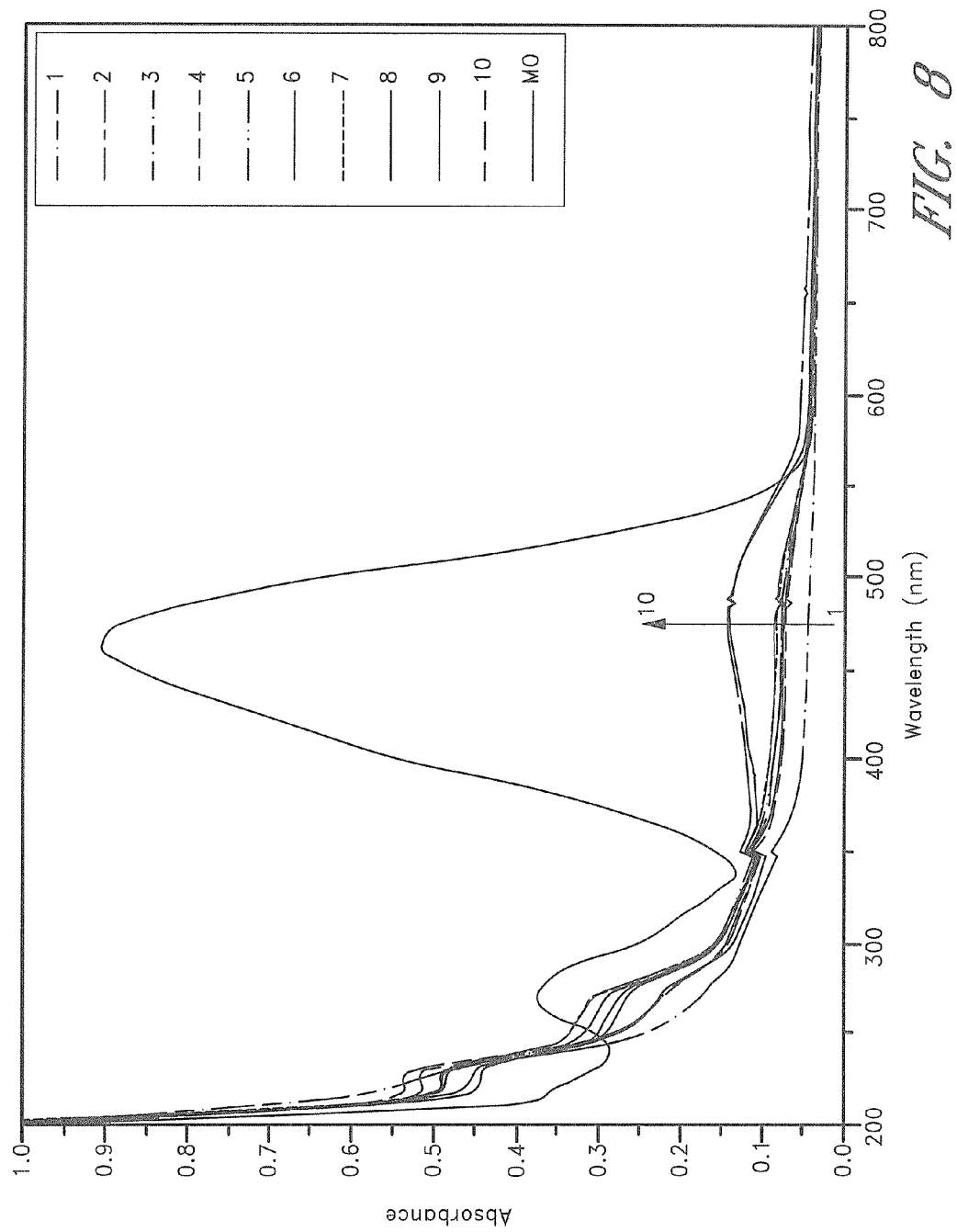
FIG. 8 shows the visible light photodegradation of a MO using an updoped silver halide (AgCl).

Example 5—Effect of Repeated Irradiation on the Photocatalytic Activity of Sm-Doped AgCl Formed by Mechanical Mixing FIG. 8 illustrates photodegradation of MO by Sm-doped AgCl by comparing the absorbance spectrum of MO after repeated irradiation with visible light in the presence of catalyst. The samarium was combined with silver chloride by mechanical mixing with a heat treating process. The amount of Sm-doped AgCl used was about 0.05 g and the volume of MO solution was about 25 ml. All data were obtained within 15 minutes of irradiation by visible light. A continuous 10 cycles of the catalyst was used. MO had an absorbance of about 0.9 prior to photocatalytic degradation. After a single irradiation in the presence of Sm-doped AgCl catalyst, the absorbance of MO decreased to about 0.05, with a degradation rate of greater than 90% in the first 15 minutes. The photocatalytic stability (cycle life) of the Sm-doped AgCl was decreased compared to the Ce-doped AgCl after 9 and 10 irradiation cycles.

Figure 9:
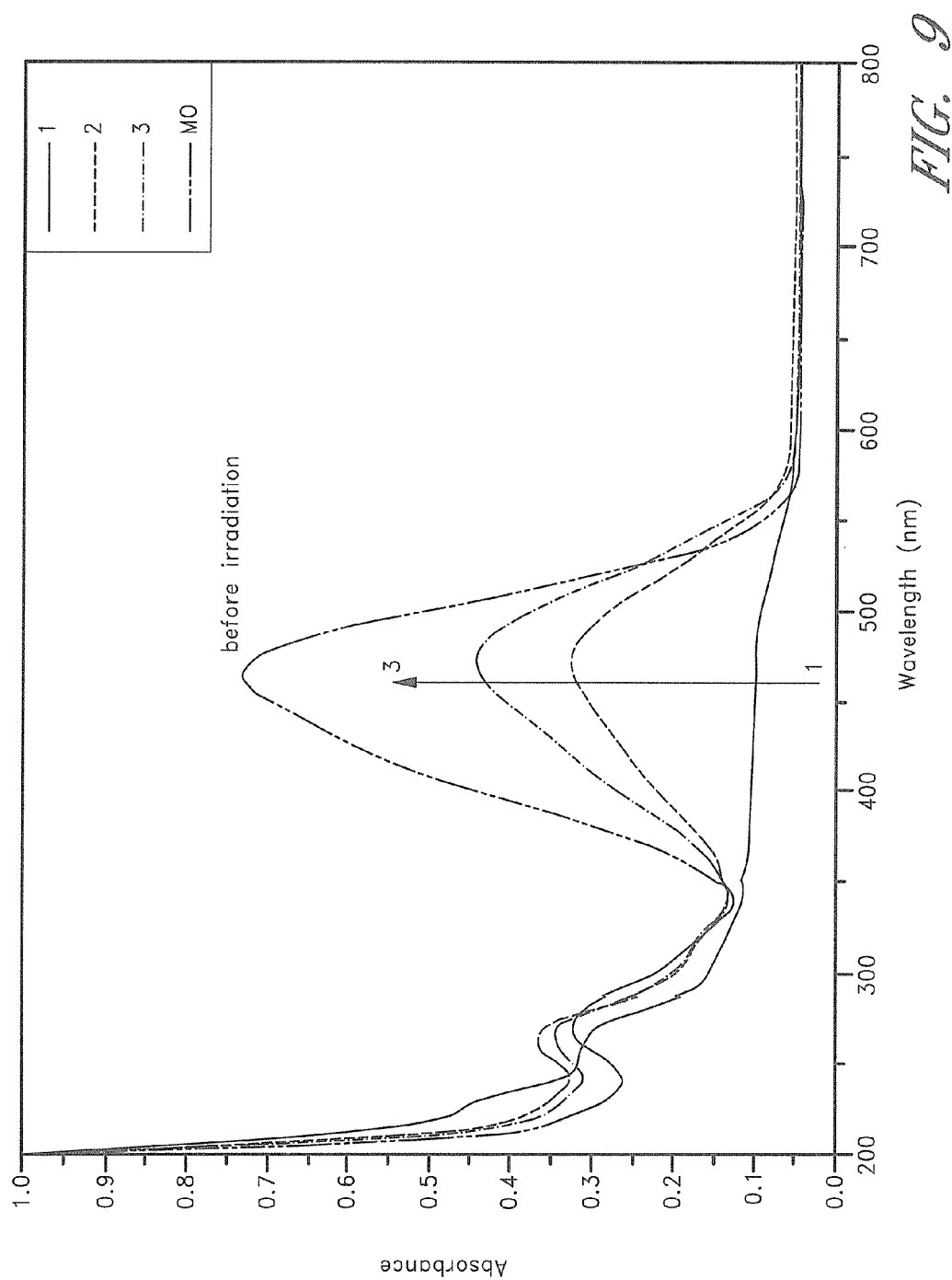
FIG. 9 shows the visible light degradation rate % of MO using a variety of degradation compositions.

Example 6—Effect of Repeated Irradiation on the Photocatalytic Activity of Undoped AgCl FIG. 9 illustrates photodegradation of MO by undoped AgCl by comparing the absorbance spectrum of MO after 3 irradiation cycles with visible light in the presence of photocatalyst. A continuous 3 cycles of the catalyst was used. As shown by FIG. 9, in this experiment, MO has an absorbance of around 0.75 prior to irradiation in the presence of photocatalyst. After a single irradiation, the absorbance of MO decreased to about 0.10 in the first 15 minutes. Further cycles of irradiation led to a reduced photocatalytic activity of the undoped catalyst. These results demonstrate that both Ce-doped AgCl (as shown e.g., in FIGS. 4 and 6) and Sm-doped AgCl (as shown in FIG. 8) provided greater retention of photocatalytic activity compared to undoped AgCl (as shown in FIGS. 7 and 9).

Figure 10:
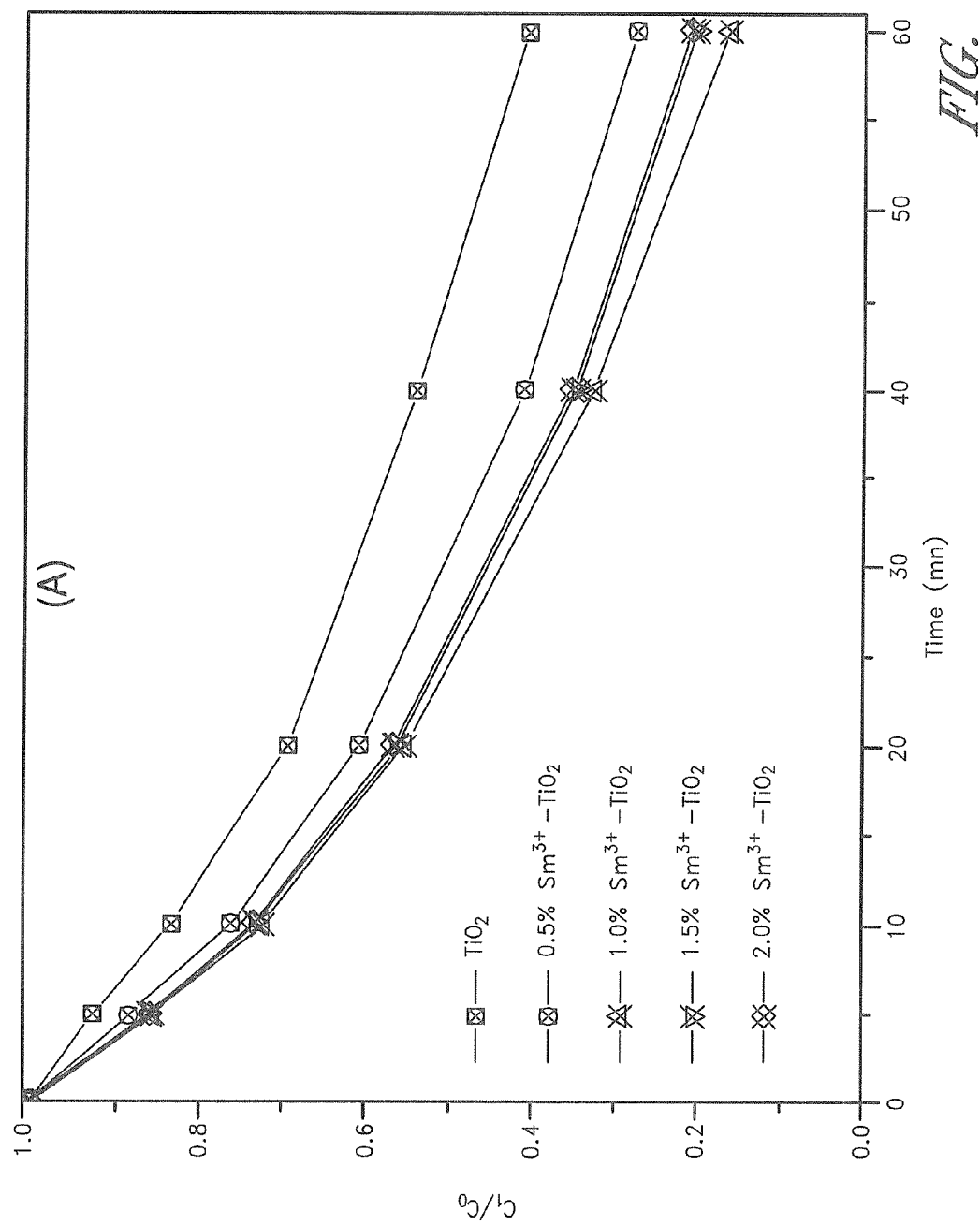
FIG. 10 shows a device for reacting a silver halide-rare earth element composition with a pollutant.

Example 7—Time Course of Orange I Degradation Using Various $TiO_2$ Photocatalysts FIG. 10 illustrates the effectiveness of $TiO_2$ photocatalysts, with and without samarium (Sm) doping in degrading 0.06 mM Orange I. The representative compositions are: (a) $TiO_2$; (b) 0.5% Sm—$TiO_2$; (c) 1.0% Sm—$TiO_2$; (d) 1.5% Sm—$TiO_2$; and (e) 2% Sm—$TiO_2$. As shown by FIG. 10, the maximum degradation rate for these examples is less than 40% at 15 min even at the highest catalyst concentration. Thus, the rare earth element-silver halide compositions were found to be unexpectedly superior to the rare earth element doped $TiO_2$.

While a number of preferred embodiments of the invention and variations thereof have been described in detail, other modifications and methods of using will be apparent to those of skill in the art. Accordingly, it should be understood that various applications, modifications, and substitutions may be made of equivalents without departing from the spirit of the invention or the scope of the claims.

What is claimed is:

1. A photocatalyst comprising a silver halide combined with one or more rare earth elements selected from the group consisting of Sc, Y, La, Ce, Pm, Sm, Eu, Gd, Dy, Ho, Tm, Yb, and Lu, wherein the photocatalyst has activity as a UV or a visible light photocatalyst, and wherein the elements have a weight % of about 1% to about 5%.

2. The photocatalyst of claim 1, wherein the one or more rare earth elements is selected from the group consisting of Ce, Sm, and Eu.

3. The photocatalyst of claim 1, wherein a cycle life of the photocatalyst is at least about 20% greater than a cycle life of the silver halide without the rare earth element(s).

4. The photocatalyst of claim 1, wherein a cycle life of the photocatalyst is at least about 6 cycles.

5. The photocatalyst of claim 1, wherein a light trapping property of the photocatalyst is about 5% to about 15% greater than a light trapping property of the silver halide without the rare earth element(s).

6. The photocatalyst of claim 1, wherein a separation of photo-generated electron-holes of the photocatalyst is greater than a separation of photo-generated electron-holes of the silver halide without the rare earth element(s).

7. The photocatalyst of claim 1, wherein a separation of photo-generated electron-holes of the photocatalyst is about 5% to about 15% greater than a separation of photo-generated electron-holes of the silver halide without the rare earth element(s).

8. The photocatalyst of claim 1, wherein the photocatalyst has a degradation efficiency of at least about 70%.

9. The photocatalyst of claim 1, wherein molar ratio of the rare earth element to the silver halide is about 0.01% to about 10%.

* * * * *